United States Patent [19]

Yokoyama et al.

[11] Patent Number: 4,468,254

[45] Date of Patent: Aug. 28, 1984

[54] WAX EMULSION

[75] Inventors: Nobuo Yokoyama, Yokohama; Yoshihiko Araki, Tokyo, both of Japan

[73] Assignee: Nippon Oil Co., Ltd., Tokyo, Japan

[21] Appl. No.: 484,926

[22] Filed: Apr. 14, 1983

[30] Foreign Application Priority Data

Apr. 20, 1982 [JP] Japan .................................... 57-65608

[51] Int. Cl.$^3$ ...................... C08L 91/06; C08L 95/00; C08L 91/08
[52] U.S. Cl. ...................................... 106/271; 524/62; 524/478; 106/901
[58] Field of Search ....................... 106/270, 271, 901; 524/62, 276, 475, 478

[56] References Cited

U.S. PATENT DOCUMENTS

| | | | |
|---|---|---|---|
| 3,382,098 | 5/1968 | Fauber | 106/271 |
| 3,893,961 | 7/1975 | Walton | 106/270 |
| 4,265,663 | 5/1981 | Gilicinski | 106/271 |
| 4,367,097 | 1/1983 | Sakanaka | 106/901 |

Primary Examiner—Theodore Morris
Attorney, Agent, or Firm—Bucknam and Archer

[57] ABSTRACT

A wax emulsion is disclosed which upon application to a material forms a film capable of keeping the material water-proof or otherwise protective against ambient influences. The quality of the wax emulsion is improved by the combination of a hydrocarbon wax with a liquid polybutadiene a polybutene or a polyisobutylene.

3 Claims, No Drawings

WAX EMULSION

BACKGROUND OF THE INVENTION

1. Field of the Invention

This invention relates to wax emulsions for use in water-proofing or otherwise protecting various materials.

2. Description of the Prior Art

Heretofore, hydrocarbon wax has found extensive application in for example water-proofing a material because it remains to be solid at room temperature, has a definite melting point at relatively low temperatures and is per se hydrophobic. Its application is also intended to provide an improvement in mechanical strength, gloss, smoothness and other protective properties of numerous materials.

Hydrocarbon wax is usually impregnated in or coated on fibrous materials such as wood, paper, yarn and fabric, as well as articles made of plaster, porcelain, cement and the like. It is more recently applied also to fertilizers, agricultural chemicals, medicines and the like. To effect impregnation or coating of the hydrocarbon wax, this is usually heated to melt, dissolved or dispersed in a solvent, or emulsified in water. However, it can be best applied in the form of an emulsion, considering safety, economy and workability.

Although hydrocarbon wax is hydrophobic, its emulsion when coated and dried at room temperature can hardly make the resultant coated surface water-proof. This is because its film-forming temperature is higher than room temperature and hence, it is believed that the coated surface merely has a distribution of discrete hydrocarbon wax particles with interstices permitting passage of water therethrough. An attempt was made to form a continuous film by fusing together such discretely arranged wax particles with heat, but this has not significantly improved water-proofness of the coated surface. It is believed that the film of the coat which appears microscopically to be continuous is still discrete due to the presence of pores, ruptures or interstices of the crystals which develop on account of the hydrocarbon wax being crystalline and fragile and which allow intrusion of water.

Another attempt was made to reduce the film-forming temperature of hydrocarbon wax with use of certain additives. This was quite possible, but such additives were not satisfactory in their own water-resistance or compatibility with the hydrocarbon wax.

SUMMARY OF THE INVENTION

With the foregoing drawbacks of prior hydrocarbon wax emulsions in view, the present invention provides a novel wax emulsion which comprises a hydrocarbon wax admixed with a polymer selected from the group consisting of liquid polybutadiene, polybutene and polyisobutylene.

It is a principal object of the invention to provide a wax emulsion which on application to various materials forms a film which is substantially transparent and smooth and highly cohesive, water-resistant and water-proof.

This and other objects and features of the invention will be better understood from a fuller description of the invention which follows.

According to the invention, there is provided a wax composition comprising (i) 100 parts by weight of a hydrocarbon wax having a melting point of 40°–120° C., and (ii) 3–25 parts by weight of a polymer of the group consisting of a liquid polybutadiene having a number average molecular weight of 500–10,000, a polybutene having a number average molecular weight of 300–3,000 and a polyisobutylene having a viscosity average molecular weight of 20,000–50,000, the composition being emulsified in water.

DESCRIPTION OF THE PREFERRED EMBODIMENTS

The component (i) of the wax composition according to the invention is a hydrocarbon wax having a melting point ranging from 40° to 120° C., preferably from 50° to 100° C. The wax becomes liquid at room temperature if its melting point is lower than 40° C. and hence is useless for the purpose of the invention, while higher melting points than 120° C. would make the wax difficult to be emulsified in water.

Hydrocarbon waxes eligible for the purpose of the invention include petroleum distillate wax, synthetic wax and naturally-occurring wax all having melting points in the above specified range. The petroleum wax includes non-refined paraffin wax and microcrystalline wax such as slack wax and scale wax which result from dewaxing vacuum distillates, vacuum distillate residues or heavy oil distillates, and refined waxes of this class which have undergone solvent treatment, sweating, acid/alkali washing, clay treatment and hydrogenation.

The synthetic wax according to the invention includes a polyolefin wax resulting from homopolymerization or copolymerization of for example ethylene and propylene, a wax resulting from thermal cracking of high molecular plastic or rubber-like polyolefins, a wax available as by-product during manufacture of high molecular plastic polyolefins, and Fischer Tropsch wax. Typical examples of the naturally occurring wax according to the invention are ozokerite and ceresine.

In the practice of the invention, any of the above waxes may be used alone or in combination.

The component (ii) of the wax composition of the invention is one of the group consisting of liquid polybutadiene, polybutene and polyisobutylene. The liquid polybutadiene has a number average molecular weight of 500–10,000, preferably 800–5,000. Departures from this range below 500 would result in weak and less water-proof coat film and above 10,000 would make it difficult to emulsify the wax in water. Specific examples of the liquid polybutadiene are not only low homopolymers of butadiene, but also include copolymers of butadiene and one or more of conjugated diolefins of 4–5 carbon atoms such as isoprene and piperylene, and low copolymers of butadiene, with or without said conjugated diolefins, and aliphatic or aromatic vinyl monomers having an ethylene unsaturation such as isobutylene, diisobutylene, styrene, α-methyl styrene, vinyl toluene, and divinyl benzene. These butadiene polymers may be obtained by any conventional method. For example, an anionic polymerization method may be employed in which butadiene alone or with conjugated diolefins of 4–5 carbon atoms is polymerized with styrene, α-methyl styrene, vinyl toluene or divinyl benzene in an amount of less than 50 mol % based on butadiene in the presence of an alkali metal or an alkali organometal catalyst at 0°–100° C. In such instance, a chain transfer polymerization method is applicable in which an organometal compound such as benzyl sodium is used as catalyst and toluene or other compounds having alkylaryl groups is used as a chain transfer agent so as to obtain a light color polymer which has a controlled molecular weight and minimum gel as disclosed in U.S. Pat. No. 3,789,090. A living polymerization method may be also considered as taught in Japanese Patent Publication Nos. 42-17485 and 43-27432 in which a polycyclic aromatic compound such as naphthalene is used as an activating agent in tetrahydrofuran solvent and an alkali metal such as sodium is used as catalyst. Other eligible polymerization methods include the use of aromatic hydrocarbon solvents such as of toluene and xylene, sodium and similar metal dispersion catalysts and ethers such as dioxane to control the molecular weight of the resultant polymer as taught in Japanese Patent Publication Nos. 32-74446, 33-1245 and 34-10188, and further the anionic polymerization in which acetylacetonate compound of Group VIII metals of the Periodic Table such as cobalt and nickel, or alkylaluminum halogenide is used as catalyst as shown in Japanese Patent Publication Nos. 45-507 and 46-30300. In addition to the polybutadienes available from the above polymerization processes, there may also be used butadiene-isobutylene low polymers which are produced in the presence of Friedel-Crafts catalyst such as aluminum chloride, borontrifluoride or their complexes. Hydrogenated polybutadiene may also be used such as those liquid polybutadienes which have been hydrogenated in the presence of nickel or nickel-molybdenum oxychloride catalyst.

Polybutene, which is another component (ii) according to the invention, has a number average molecular weight of 300–3,000, preferably 450–1,500. Polybutene departing from this range below 300 would be a liquid of low viscosity, resulting in very weak film. Polybutene of greater than 3,000 in this molecular weight would be too viscous and hence difficult to be blended with other waxes and also difficult to be emulsified in water.

The polybutene under contemplation has its source from mixtures of butene-1, butene-2, isobutylene and butanes which may be processed by any suitable known methods. A typical example of such known method comprises reacting a starting material of butane-butene fraction (available as side-product during the cracking of naphtha into ethylene or propylene) at −30°–30° C. in the presence of a Friedel-Crafts catalyst such as aluminum chloride, magnesium chloride, boron fluoride, titanium tetrachloride and complexes thereof, or with or without addition of an organic halide or chloric acid, in which instance any solvent is required as butane and unreacted olefins act as the solvent. The resulting polybutene is usually settled in a tank to remove the catalyst and is, if necessary, washed with alkali, water, nitric acid, sulfuric acid, oxalic acid and the like, or further treated with bauxite and active clay to complete removal of all residual catalyst particles. The treated product may be flushed to separate unreacted gas, stripped of light polymers and further, if necessary, refined. The polybutene for use in the invention may be hydrogenated in a well known manner by the use of nickel or nickel-molybdenum oxychloride.

Polyisobutylene, another component (ii) according to the invention, has a viscosity average molecular weight of 20,000–50,000, preferably 20,000–40,000. It is a highly viscous, low-fluidity, semi-liquid vitreous material. Polyisobutylenes of a viscosity average molecular weight exceeding 50,000 are a semi-rubber which is hard to dissolve or emulsify in wax in the usual manner.

The polyisobutylene to be used in the invention is prepared by the polymerization of isobutylenes available from a butane-butene fraction or from dehydration of tertiary butylalcohol or diacetone alcohol which may be refined by molecular sieve. The isobutylene feed is polymerized at −80°–−150° C., as is well known, with the addition of ethylene or propane as diluent and boron trifluoride or aluminum chloride in the form of methyl chloride or ethyl chloride solution.

It has been found that excellent results can be obtained by blending 100 parts by weight of hydrocarbon wax, i.e. component (i) with 3–25 parts by weight of any of the polymers, i.e. component (ii), which is either the liquid polybutadiene, the polybutene, or the polyisobutylene that has been above discussed. Amounts of the liquid polybutadiene and the polybutene are preferably 5–20 weight parts, more preferably 5–15 weight parts, and that of the polyisobutylene is preferably 3–15, more preferably 3–10 weight parts. The three component polymers (ii) may be used singly or in combination as long as their total amounts remain within the range of 5–25 weight parts per 100 weight parts of the hydrocarbon wax (i). Smaller amounts of component (ii) than 3 weight parts would result in deteriorated film properties, and greater amounts than 25 weight parts would result in sticky film.

In order to improve the water resistance and proofness of the coat film, the wax composition may be blended with a petroleum resin, ethylene-vinyl acetate copolymer, asphalt or mixtures thereof. These materials may be added in any suitable amount, but usually in an amount of not more than 10 weight parts per 100 weight parts of the hydrocarbon wax. The wax composition of the invention may be further blended with an antioxidant such as 2,6-di-tert-butyl-4-methylphenol (BHT), 2,2′-methylenebis(4-methyl-6-tert-butylphenol), 4,4-butylidenebis(3-methyl-6-tert-butylphenol), 4,4′-thiobis(3-methyl-6-tert-butylphenol), 2,2′-thiobis(4-methyl-6-tert-butylphenol), 1,3,5-trimethyl-2,4,6-tris(3,5-di-tert-butyl-4-hydroxybenzyl)benzene, dilaurylthiodipropionate (DLTDP), distearylthiodipropionate (DSTDP), tridecylphosphite (TDP), diphenyldecylphosphite (DPDP), triphenylphosphite (TPP), and tris-nonylphenylphosphite (TNP), and also with an ultraviolet ray absorbing agent such as 2-hydroxy-4-methoxybenzophenone, 2-hydroxy-4-octoxybenzophenone, 2,4-dihydroxybenzophenone, 2(2′-hydroxy-5-methylphenyl)benzotriazole, substituted benzotriazole, 2-ethylhexyl-2-cyano-3,3′-diphenyl acrylate, ethyl-2-cyano-3,3′-diphenyl acrylate, phenyl salicylate, and 4-t-butylphenyl salicylate. These additives are used usually in an amount of not more than 1 weight percent of the total wax composition. To facilitate emulsification of the wax composition, there may be used an oxygen-containing wax and/or an emulsifier. The oxygen-containing wax includes specifically an oxidized paraffin, an unsaturated polyvalent carboxylic acid modified wax, a naturally occurring oxygen-containing wax or modifiers thereof. The oxydized paraffin is a paraffin which is oxidized with air in the presence of a catalyst such as potassium permanganate and maganese soap and which may or may not be saponified. The paraffin has an acid value of 10–80, preferably 20–70, and a melting point of 30°–110° C., preferably 40°–85° C. The polyvalent carboxylic acid modified wax may be prepared from a mixture of 10–80 weight parts of a petroleum fraction melting in the range of 50°–85° C. and 90–20 weight parts of a polyolefin wax melting in the range of 36°–120° C. and having a number average molecular weight of 310–1,000 and a double bond number of 5–50 per 1,000 carbon atoms, the mixture being reacted in 100 weight parts with 3–25 weight parts of an unsaturated polyvalent carboxylic acid or its anhydride in a condition in which free radicals are produced, as fully disclosed in Japanese Laid-Open Patent Publication No. 54-81306. The petroleum fraction has a melting point of 50°–70° C., typical examples of which are paraffin wax, microcrystalline wax or unrefined paraffin wax such as slack wax and scale wax. The polyolefin wax is most preferably an ethylene polymer, but may also be a propylene polymer or other olefin copolymers containing ethylene and propylene as a monomer. The polyolefin wax has a melting point of 36°–120° C., preferably 36°–90° C., a number average molecular weight of 310–1,000, preferably 310–600, and a double bond number of 5–50, preferably 10–45 per 1,000 carbon atoms. The polyvalent carboxylic acid modified wax may be prepared from a mixture of a petroleum wax and a polyolefin wax added in a ratio of 10–80 weight parts: 90–20 weight parts, preferably 30–70 weight parts: 70–30 weight parts, the mixture being reacted in 100 weight parts with 3–25 weight parts, preferably 8–18 weight parts of an unsaturated polyvalent carboxylic acid or its anhydride in a free radical producing condition in which for example 0.2–5 weight parts of organic peroxide is added per 100 weight parts of wax composition. The organic peroxide includes di-tert-butyl peroxide, tert-butyl hydroperoxide, dicumyl peroxide, tert-butyl cumyl peroxide, cumyl hydroperoxide, 2,5-dimethyl-2,5-(di-tert-butylperoxy)hexane, 2,5-dimethyl-2,5-di(tert-butylperoxy)hexane-3, and methyl ethyl ketone peroxide or mixtures thereof. Ditertiary butyl peroxide is most preferred.

The unsaturated polyvalent carboxylic acid or its anhydride includes maleic acid, itaconic acid and citraconic acid, of which maleic acid is most preferred.

The amount of addition of the unsaturated polyvalent carboxylic acid or its anhydride to the mixture as above specified is a critical factor for the properties of the resulting oxygen-containing wax. Departures from the lower limit of the specified range would result in too low acid value and insufficient emulsification of the product. Departures from the upper limit of the range would result in too high acid value of the product with unreacted acid residues to be troublesomely removed. The reaction conditions, though not limited, may be 120°–220° C., preferably 140°–180° C. in temperature and 0.5–6.0 hours, preferably 1–3 hours in time.

Specific examples of the naturally occurring oxygen-containing wax and its modified product are modified montan wax, carnauba wax and bee's wax. Of the various oxygen-containing waxes above exemplified, the unsaturated polyvalent carboxylic acid modified wax is most preferred. These oxygen-containing waxes may be added alone or together with the emulsifiers in an amount of 2–20, preferably 4–16 weight parts to 100 parts of the hydrocarbon wax (i). To improve the emulsification of the oxygen-containing wax, there may be added some basic compound such as ammonium or amines including morpholine, trialkylamine and trialkanol amine. These basic materials may be added in an amount of not more than 7, preferably 3 weight parts per 100 parts of the hydrocarbon wax (i).

The emulsifiers to be used in the invention may be preferably nonionic and anionic surfactants. Specific examples of nonionic emulsifier are polyethylene glycol alkyl ether, polyethylene glycol aliphatic acid esters, polypropylene glycol alkyl ether, polypropylene glycol aliphatic acid esters, polypropylene glycol polyethylene glycol ether, and polyethylene glycol sorbitan aliphatic acid esters, more specifically Span 60, Span 80, Tween 60, Tween 80 and Emulgen 420, all of which are sold by Kao Atlas Powder. An example of anionic emulsifier is higher fatty acid, more specifically oleic acid. These emulsifiers may be used alone or in combination and usually in an amount of 3–25 weight parts, preferably 5–20 weight parts per 100 parts of the hydrocarbon wax (i). Increased amounts of the emulsifier would literally provide improved stability and other properties of the aqueous emulsion on one hand, but on the other hand would lead to reduced resistance to water of the film. These emulsifiers, if used at all, should be used in a limited quantity. The tendency of the emulsion to become deteriorated due to non-use of the emulsifiers can be well eliminated by the use of the polymers already described as component (ii) of the present composition. The emulsifiers when used in combination with the oxygen-containing wax should be in amounts not exceeding 10 weight parts per 100 parts of the hydrocarbon wax (i).

When emulsifying the wax composition, there is added water usually in an amount of 0.8–10 times, preferably 0.8–5 times by weight greater than the total wax composition. The emulsification may be effected by any suitable known methods, for example a mechanical method and a phase inversion method, both of which may be co-used. The mechanical method relies on the use of a homomixer, homogenizer, colloid mill and supersonic wave, any of which alternatives may be used as long as there may be obtained a homogeneous wax emulsion. Temperatures for emulsification are not particularly limited, but preferably about 60°–65° C. for polybutadiene and polybutene and about 70°–75° C. for polyisobutylene, so as to avoid solids precipitation and maintain suitably low liquid viscosity.

There may be also added some polymer emulsion in order to improve water resistance and water proofness. Such a polymer emulsion should have a minimum film-forming temperature of −15°–85° C. and is an aqueous emulsion of a polar vinyl homopolymer or copolymer, specific examples of which include acrylic acid ester, methacrylic acid ester, vinyl ester and homopolymers or copolymers of acrylonitrile, acrylic acid, methacrylic acid and styrene monomers. More specific examples are methylacrylate, ethylacrylate, butylacrylate and 2-ethylhexylacrylate, methylmethacrylate, ethylmethacrylate, butylmethacrylate and 2-ethylhexylmethacrylate, and homopolymers or copolymers of vinyl acetate, acrylnitrile, acrylic acid, mathacrylic acid and styrene monomers. To these polymer emulsions may be further added some self-cross-linking modified polymers.

The above polymer emulsions may be prepared by any suitable known methods. For example, the monomers may be subjected to emulsion polymerization in water in the presence of a redox catalyst comprising a combination of a water-soluble polymerization initiator such as potassium persulfate, ammonium persulfate and hydrogen peroxide and an organic or inorganic reducing agent, in which instance nonionic emulsifiers, anionic emulsifiers and reactive emulsifiers may be preferably used either singly or in combination. Examples of the reactive emulsifiers are unsaturated group-containing sulfonate or sulfuric acid ester. The emulsifiers may be used in an amount of 0.1-20 weight parts, preferably 1-10 weight parts per 100 parts of the starting monomers. During polymerization of the monomers, there may be added a protective colloid viscosity improver such as polyvinyl alcohol, polyacryl amide, natural and synthetic rubber latexes, polyesters, urethane emulsion and epoxy resin emulsions.

The wax emulsion of the invention and the above polymer emulsions may be blended in a ratio of 95-50-:5-50, preferably 90-55:10-45 and by any suitable method to make a homogeneous mixture.

The invention will be further described by way of the following inventive and comparative examples.

INVENTIVE EXAMPLES 1-13

Wax emulsions were prepared from the various compositions indicated in Table 1 and by the method in which hydrocarbon wax, liquid polybutadiene, polybutene, and/or polyisobutylene and oxygen-containing wax (except in Examples 6 and 13) were charged into a 3 liter beaker and heated with stirring to a temperature of 105° C., at which time emulsifier (except in Examples 2 and 10) and basic material (except in Examples 6 and 13) were added. The whole was vigorously stirred and boiling water was added over about 10 minutes and it was thereafter cooled to 60°-75° C. The admixture was then processed through a homogenizer to make a homogeneous emulsion which was slowly cooled to room temperature thereby producing a wax emulsion.

COMPARATIVE EXAMPLES 1-14

Table 2 shows the various compositions used for the preparation of wax emulsions for purposes of comparison in which the polymers according to the invention, i.e. liquid polybutadiene, polybutene and polyisobutylene were not used. The method used in these Comparative Examples is the same as used in the Inventive Examples. It will be noted that the amount of the hydrocarbon wax was increased in Comparative Examples 1-4 instead of using the liquid polybutadiene as in Inventive Examples 1-6. Comparative Examples 8 and 10-13 correspond to Inventive Examples 8 and 10-13. The component (ii) was used in Comparative Examples 9 and 14 in a manner similar to Inventive Examles 8 and 11.

The wax emulsions prepared as in Inventive Examples and Comparative Examples were tested with the results shown in Tables 3 and 4, respectively. The tests include:

(a) Emulsion quality test.

(1) viscosity—measured by 30 rpm Brookfield viscometer.

(2) Maron test (shear stability) according to Analytical Chemistry, 25, 1087(1953) wherein sample of 50 g. was subjected to load of 5 kg. and 1,000 rpm for 2 minutes, the resulting precipitate being vacuum dried at 40° C. and weighed to represent weight % based on solids in the sample.

(3) particle size—measured by the Coulter counter (manufactured by Coulter Electronics, Inc., U.S.A.) with a pore size of 20 microns.

(b) Coated film quality test.

Wax emulsion sample was coated on several pieces of slide glass and dried at room temperature, some of which were further heat-treated at constant temperature. The coated film surfaces were examined for their appearance and feel.

(c) Water resistance test.

The coated film on each of the slide glasses was immersed in water and observed daily for wetting and stripping off. The mark ∞ designates those samples which did not show any signs of defects after a lapse of 20 days.

(d) Water proofness test.

Samples of wax emulsion were coated on Kraft paper by 10 mil. applicator and dried at room temperature, some of which were further heat treated. All these samples were subjected to Stockigt sizing test according to Japanese Industrial Standards P-8122 to measure time length for liquid permeation. This time length blank tests of uncoated Kraft paper was 35 seconds.

(e) Water proofness test.

Melabin wood, which is selectively homogeneous, was cut to a size of 40 mm × 40 mm × 18 mm and dipped in each of the sample wax emulsions and dried at room temperature. Some of these samples were further heat-treated. The wood chips were soaked in water for 24 hours and then weighed, so that weight differential from before soaked was taken to determine the rate of water absorption according to Japanese Industrial Standards A-5905. Blank tests with uncoated wood chips showed a weight differential of 32 weight %.

TABLE 1

| | | | | Example 1 | Example 2 | Example 3 | Example 4 | Example 5 |
|---|---|---|---|---|---|---|---|---|
| wax composition (part by weight) | component (i) | hydrocarbon wax | paraffin wax (melt point 52° C.) | 100.0 | — | 93.6 | 100.0 | — |
| | | | paraffin wax (melt point 63° C.) | — | 100.0 | — | — | 100.0 |
| | | | microcrystalline wax (melt point 82° C.) | — | — | — | — | — |
| | | | polyethylene wax*1 | — | — | 6.4 | — | — |
| | component (ii) | (A) liquid polybutadiene | number-average molecular weight 1,500 | — | 11.0 | — | 7.7 | — |
| | | | number-average molecular weight 3,000 | 11.1 | — | 7.1 | 10.0 | 11.1 |
| | | (B) polybutene | number average molecular weight 420 | — | — | — | — | — |
| | | | number-average molecular weight 900 | — | — | — | — | — |
| | | (C) poly- | number-average | — | — | — | — | — |

TABLE 1-continued

| | | | | | | | | |
|---|---|---|---|---|---|---|---|---|
| | | isobutylene | molecular weight 30,000 | | | | | |
| | | | number-average molecular weight 50,000 | — | — | — | — | — |
| | | | number-average molecular weight 40,000 | — | — | — | — | — |
| | oxygen-containing wax | | polyvalent carboxylic acid modified wax*2 | 5.8 | 5.8 | 5.6 | 11.1 | — |
| | | | paraffin oxide*3 | — | — | — | — | 13.0 |
| | basic material | | morpholine | 1.0 | — | 1.0 | 3.2 | — |
| | | | triethylamine | — | 1.3 | — | — | 1.0 |
| | emulsifier | | Tween/Span 80:80 | — | — | — | — | 4.0 |
| | | | oleic acid | 0.8 | — | 0.4 | 1.3 | — |
| | Water (by weight times) | | | 1.19 | 1.06 | 1.19 | 2.06 | 2.33 |

| | | | | Example 6 | Example 7 | Example 8 | Example 9 | Example 10 |
|---|---|---|---|---|---|---|---|---|
| wax composition (part by weight) | component (i) | hydrocarbon wax | paraffin wax (melt point 52° C.) | 100.0 | — | — | — | 15.0 |
| | | | paraffin wax (melt point 63° C.) | — | 100.0 | 100.0 | 100.0 | — |
| | | | microchrstalline wax (melt point 82° C.) | — | — | — | — | 85.0 |
| | | | polyethylene wax*1 | — | — | — | — | — |
| | component (ii) | (A) liquid polybutadiene | number-average molecular weight 1,500 | 8.0 | — | — | — | — |
| | | | number-average molecular weight 3,000 | — | 25.0 | — | — | — |
| | | (B) polybutene | number average molecular weight 420 | — | — | — | — | — |
| | | | number-average molecular weight 900 | — | — | 15.0 | 4.0 | 11.5 |
| | | (C) polyisobutylene | number-average molecular weight 30,000 | — | — | — | — | — |
| | | | number-average molecular weight 50,000 | — | — | — | — | — |
| | | | number-average molecular weight 40,000 | — | — | — | — | — |
| | oxygen-containing wax | | polyvalent carboxylic acid modified wax*2 | — | 6.6 | 6.5 | 6.0 | 6.0 |
| | | | paraffin oxide*3 | — | — | — | — | — |
| | basic material | | morpholine | — | 1.4 | 1.3 | 1.2 | 1.3 |
| | | | triethylamine | — | — | — | — | — |
| | emulsifier | | Tween/Span 80:80 | 16.0 | — | — | — | — |
| | | | oleic acid | — | 0.9 | 0.7 | 0.65 | — |
| | Water (by weight times) | | | 2.33 | 1.18 | 1.0 | 1.0 | 1.35 |

| | | | | | Example 11 | Example 12 | Example 13 |
|---|---|---|---|---|---|---|---|
| | wax composition (part by weight) | component (i) | hydrocarbon wax | paraffin wax (melt point 52° C.) | — | — | 95.0 |
| | | | | paraffin wax (melt point 63° C.) | 95.0 | 95.0 | — |
| | | | | microchrstalline wax (melt point 82° C.) | — | — | — |
| | | | | polyethylene wax*1 | 5.0 | 5.0 | — |
| | | component (ii) | (A) liquid polybutadiene | number-average molecular weight 1,500 | — | — | — |
| | | | | number-average molecular weight 3,000 | — | — | — |
| | | | (B) polybutene | number average molecular weight 420 | — | 1.0 | — |
| | | | | number-average molecular weight | — | — | — |

TABLE 1-continued

| | | | | | | |
|---|---|---|---|---|---|---|
| | (C) poly-isobutylene | number-average molecular weight 900 | 8.0 | — | — | |
| | | number-average molecular weight 30,000 | — | 2.0 | — | |
| | | number-average molecular weight 50,000 | — | — | — | |
| | | number-average molecular weight 40,000 | | | | |
| oxygen-containing wax | polyvalent carboxylic acid modified wax*2 | | — | 6.0 | — | |
| | paraffin oxide*3 | | 8.0 | — | — | |
| basic material | morpholine | | — | 1.6 | — | |
| | triethylamine | | 1.5 | — | — | |
| emulsifier | Tween/Span 80:80 | | — | — | 12.0 | |
| | oleic acid | | 1.0 | 0.4 | — | |
| | Water (by weight times) | | 1.5 | 1.25 | 1.5 | |

*Notes in Tables 1 and 2
*1polyethylene wax is a by-product available from medium and low pressure polyethylene manufacture and has a melting point of 90° C. and a molecular weight of 800.
*2polyvalent carboxylic acid modified wax is a maleic acid modified wax having a melt point of 70° C. and an acid value of 83, which result from the reaction of 100 weight parts of an equivalent mixture of 145° F. paraffin wax (melting at 63° C.) and polyethylene wax (melting at 80° C., number average molecular weight 450 and double bond number 321 per 1,000 carbon atoms) and 13 weight parts of maleic acid anhydride in the presence of one weight part of di-tert-butylperoxide.
*3paraffin oxide has a melt point of 67° C. and an acid value of 28.
*4This is a commercially available white wax emulsion which comprises about 32 weight percent of paraffin wax melting at 57° C., about 3 weight percent of polyethylene glycol emulsifier and water.
The tabulated test data clearly support the superiority of the wax emulsions of the invention to the prior art counterparts.

TABLE 2

| | | | | Compar. Example 1 | Compar. Example 2 | Compar. Example 3 | Compar. Example 4 | Compar. Example 5 |
|---|---|---|---|---|---|---|---|---|
| wax composition (part by weight) | component (i) | hydrocarbon wax | paraffin wax (melt point 52° C.) | 111.1 | — | 100.7 | 117.7 | — |
| | | | paraffin wax (melt point 63° C.) | — | 111.0 | — | — | 111.1 |
| | | | microcrystalline wax (melt point 82° C.) | — | — | 6.4 | — | — |
| | | | polyethylene wax*1 | — | — | — | — | — |
| | component (ii) | (A) liquid poly-butadiene | number-average molecular weight 1,500 | — | — | — | — | — |
| | | | number-average molecular weight 3,000 | — | — | — | — | — |
| | | (B) polybutene | number average molecular weight 420 | — | — | — | — | — |
| | | | number-average molecular weight 900 | — | — | — | — | — |
| | | (C) poly-isobutylene | number-average molecular weight 30,000 | — | — | — | — | — |
| | | | number-average molecular weight 50,000 | — | — | — | — | — |
| | | | number-average molecular weight 40,000 | — | — | — | — | — |
| | oxygen-containing wax | | polyvalent carboxylic acid modified wax*2 | 5.8 | 5.8 | 5.6 | 11.1 | — |
| | | | paraffin oxide*3 | — | — | — | — | 13.0 |
| | basic material | | morpholine | 1.0 | — | 1.0 | 3.2 | — |
| | | | triethylamine | — | 1.3 | — | — | 1.0 |
| | emulsifier | | Tween/Span 80:80 | — | — | — | — | 4.0 |
| | | | oleic acid | — | — | — | — | — |
| | | Water (by weight times) | | — | — | — | — | — |

| | | | | Compar. Example 6 | Compar.*4 Example 7 | Compar. Example 8 | Compar. Example 9 | Compar. Example 10 |
|---|---|---|---|---|---|---|---|---|
| wax composition | component (i) | hydrocarbon wax | paraffin wax (melt point 52° C.) | 108.0 | | — | — | 15.0 |
| | | | paraffin wax | — | | 115.0 | 100.0 | — |

TABLE 2-continued

| (part by weight) | | | | | | | |
|---|---|---|---|---|---|---|---|
| | | | (melt point 63° C.) microcrystalline wax | — | — | — | 96.5 |
| | | | (melt point 82° C.) polyethylene wax*1 | — | — | — | — |
| | component (ii) | (A) liquid polybutadiene | number-average molecular weight 1,500 | — | — | — | — |
| | | | number-average molecular weight 3,000 | — | — | — | — |
| | | (B) polybutene | number average molecular weight 420 | — | — | — | — |
| | | | number-average molecular weight 900 | — | — | 30.0 | — |
| | | (C) polyisobutylene | number-average molecular weight 30,000 | — | — | — | — |
| | | | number-average molecular weight 50,000 | — | — | — | — |
| | | | number-average molecular weight 40,000 | — | — | — | — |
| | oxygen-containing wax | | polyvalent carboxylic acid modified wax*2 | — | 6.5 | 7.5 | 6.0 |
| | | | paraffin oxide*3 | — | — | — | — |
| | basic material | | morpholine | — | 1.3 | 1.5 | 1.3 |
| | | | triethylamine | — | — | — | — |
| | emulsifier | | Tween/Span 80:80 | 16.0 | — | — | — |
| | | | oleic acid | — | 0.7 | 0.8 | — |
| | Water (by weight times) | | | — | 1.0 | 1.0 | 1.35 |

| | | | | Compar. Example 11 | Compar. Example 12 | Compar. Example 13 | Compar. Example 14 |
|---|---|---|---|---|---|---|---|
| wax composition (part by weight) | component (i) | hydrocarbon wax | paraffin wax (melt point 52° C.) | — | — | 100.0 | — |
| | | | paraffin wax (melt point 63° C.) | 103.0 | 98.0 | — | 95.0 |
| | | | microcrystalline wax (melt point 82° C.) | — | — | — | — |
| | | | polyethylene wax*1 | 5.0 | 5.0 | — | 5.0 |
| | component (ii) | (A) liquid polybutadiene | number-average molecular weight 1,500 | — | — | — | — |
| | | | number-average molecular weight 3,000 | — | — | — | — |
| | | (B) polybutene | number average molecular weight 420 | — | — | — | — |
| | | | number-average molecular weight 900 | — | — | — | — |
| | | (C) polyisobutylene | number-average molecular weight 30,000 | — | — | — | 35.0 |
| | | | number-average molecular weight 50,000 | — | — | — | — |
| | | | number-average molecular weight 40,000 | — | — | — | — |
| | oxygen-containing wax | | polyvalent carboxylic acid modified wax*2 | — | 6.0 | — | — |
| | | | paraffin oxide*3 | 8.0 | — | — | — |
| | basic material | | morpholine | — | 1.6 | — | — |
| | | | triethylamine | 1.5 | — | — | 1.7 |
| | emulsifier | | Tween/Span 80:80 | — | — | 12.0 | — |
| | | | oleic acid | 1.0 | 0.4 | — | 1.1 |
| | Water | | | 1.5 | 1.25 | 1.5 | 1.5 |

TABLE 2-continued
(by weight times)

*Notes in Tables 1 and 2
*¹polyethylene wax is a by-product available from medium and low pressure polyethylene manufacture and has a melting point of 90° C. and a molecular weight of 800.
*²polyvalent carboxylic acid modified wax is a maleic acid modified wax having a melt point of 70° C. and an acid value of 83, which result from the reaction of 100 weight parts of an equivalent mixture of 145° F. paraffin wax (melting at 63° C.) and polyethylene wax (melting at 80° C., number average molecular weight 450 and double bond number 321 per 1,000 carbon atoms) and 13 weight parts of maleic acid anhydride in the presence of one weight part of di-tert-butylperoxide.
*³paraffin oxide has a melt point of 67° C. and an acid value of 28.
*⁴This is a commercially available white wax emulsion which comprises about 32 weight percent of paraffin wax melting at 57° C., about 3 weight percent of polyethylene glycol emulsifier and water.
The tabulated test data clearly support the superiority of the wax emulsions of the invention to the prior art counterparts.

TABLE 3

| | Example 1 | Example 2 | Example 3 | Example 4 | Example 5 | Example 6 | Example 7 |
|---|---|---|---|---|---|---|---|
| (a) emulsion quality | | | | | | | |
| viscosity (C.P.) | 18.5 | 14.0 | 19.0 | 6.5 | 7.5 | 5.5 | 43.0 |
| maron test (wt. %) | 5.5 | 13.0 | 9.0 | 1.5 | 2.5 | 3.5 | 15.0 |
| average particle ( ) | 0.9 | 1.3 | 0.9 | 0.6 | 0.8 | 0.9 | 0.8 |
| film forming conditions | room temperature | room temperature 70° C., 15 min. | room temperature 70° C., 15 min. | room temperature 70° C., 15 min. | room temperature 70° C., 15 min. | room temperature 60° C., 15 min. | room temperature 60° C., 15 min. |
| (b) film quality test (glass plate) | transparent non-viscous | slightly cloudy non-viscous | slightly cloudy slightly viscous | white non-viscous | transparent slightly viscous | transparent non-viscous | semi-transparent non-viscous | transparent slightly viscous |
| (c) water resistance test (days) | | | | | | | |
| wetty | 1 | 3 | 3 | 3 | 2 | 1 | 1 | 1 |
| whitening | 1 | ∞ | ∞ | ∞ | 3 | 4 | 4 | 2 |
| stripping | 4 | 9 | 13 | 11 | 7 | 9 | 8 | 8 |
| (d) waterproof test with kraft paper (sec.) | 135 | 260 | 350 | 300 | 210 | 270 | 270 | 520 |
| (e) water-proof test with wood | 19 | 11 | 13 | 13 | 16 | 15 | 18 | 10 |

| | Example 8 | Example 9 | Example 10 | Example 11 | Example 12 | Example 13 |
|---|---|---|---|---|---|---|
| (a) emulsion quality | | | | | | |
| viscosity (C.P.) | 24.0 | 18.0 | 43.5 | 14.5 | 12.5 | 13.5 |
| maron test (wt. %) | 10.5 | 18.5 | 13.5 | 16.5 | 14.5 | 11.5 |
| average particle (μ) | 0.85 | 0.9 | 1.0 | 0.9 | 0.9 | 0.8 |
| film forming conditions | 70° C., 15 min. | 70° C., 15 min. | room temperature | 80° C., 15 min. | 80° C., 15 min. | 70° C., 15 min. |
| (b) film quality test (glass plate) | transparent slightly viscous | semi-transparent non-viscous | semi-transparent viscous | semi-transparent non-viscous | semi-transparent non-viscous | semi-transparent non-viscous |
| (c) water resistance test (days) | | | | | | |
| wetty | 3 | 3 | 1 | 1 | 1 | 2 |
| whitening | ∞ | ∞ | 5 | 3 | 2 | 3 |
| stripping | 14 | 11 | ∞ | 7 | 9 | 7 |
| (d) waterproof test with kraft paper (sec.) | 465 | 295 | 190 | 130 | 155 | 185 |
| (e) water-proof test with wood | 7.5 | 9.5 | 11.5 | 13.5 | 11.5 | 13.0 |

TABLE 4

| | Compar. Example 1 | Compar. Example 2 | Compar. Example 3 | Compar. Example 4 | Compar. Example 5 | Compar. Example 6 | Compar. Example 7 |
|---|---|---|---|---|---|---|---|
| (a) emulsion quality | | | | | | | |
| viscosity (C.P.) | 19.5 | 11.0 | 16.0 | 7.5 | 7.0 | 5.0 | 9.0 |
| maron test (wt. %) | 7.0 | 18.5 | 11.5 | 2.5 | 6.0 | 7.5 | 1.5 |
| average particle (μ) | 1.1 | 1.5 | 1.2 | 0.9 | 1.1 | 1.2 | 0.8 |
| film forming conditions | room temperature ↓ | room temperature ↓ 70° C., 15 min. | room temperature ↓ 70° C., 15 min. | room temperature ↓ 70° C., 15 min. | room temperature ↓ 70° C., 15 min. | room temperature ↓ 70° C., 15 min. | room temperature ↓ 60° C., 15 min. |
| (b) film quality test (glass plate) | cloudy, cracks, non-viscous | cloudy, cracks, non-viscous | cloudy, cracks, non-viscous | white, cracks, non-viscous | semi-transparent slightly viscous | semi-transparent non-viscous | white, non-viscous | semi-transparent slightly viscous |
| (c) water resistance test (days) | | | | | | | |

TABLE 4-continued

|  | | | | | | | | |
| --- | --- | --- | --- | --- | --- | --- | --- | --- |
| wetty | 1 | 2 | 3 | 1 | 1 | 1 | 1 | 1 |
| whitening | 1 | ∞ | ∞ | ∞ | 1 | 2 | 3 | 1 |
| stripping | 2 | 5 | 5 | 3 | 3 | 5 | 4 | 2 |
| (d) waterproof test with kraft paper (sec.) | 80 | 160 | 130 | 130 | 95 | 135 | 115 | 65 |
| (e) water-proof test with wood | 30 | 18 | 27 | 22 | 22 | 24 | 26 | 25 |

|  | Compar. Example 8 | Compar. Example 9 | Compar. Example 10 | Compar. Example 11 | Compar. Example 12 | Compar. Example 13 | Compar. Example 14 |
| --- | --- | --- | --- | --- | --- | --- | --- |
| (a) emulsion quality | | | | | | | |
| viscosity (C.P.) | 16.0 | 75.0 | 37.5 | 8.5 | 11.0 | 8.5 | not emulsified |
| maron test (wt. %) | 23.0 | 16.5 | 21.0 | 28.5 | 23.5 | 13.0 | |
| average particle (μ) | 1.3 | 0.9 | 1.2 | 1.3 | 1.3 | 0.9 | |
| film forming conditions | 70° C. 15 min. | 70° C. 15 min. | room temperature | 80° C., 15 min. | 80° C., 15 min. | 70° C., 15 min. | |
| (b) film quality test (glass plate) | white, cracks, slightly viscous | transparent viscous | semi-transparent viscous | white, cracks, non-viscous | white, cracks, non-viscous | semi-trans-non-viscous | |
| (c) water resistance test (days) | | | | | | | |
| wetty | 3 | 2 | 1 | 1 | 1 | 1 | |
| whitening | ∞ | ∞ | 1 | 1 | 1 | 1 | |
| stripping | 5 | 3 | 3 | 1 | 2 | 3 | |
| (d) waterproof test with kraft paper (sec.) | 130 | 55 | 125 | 35 | 45 | 30 | |
| (e) water-proof test with wood | 16 | 12.5 | 17.5 | 23.0 | 19.5 | 21.5 | |

What is claimed is:

1. A wax emulsion prepared from a composition comprising 100 parts by weight of a hydrocarbon wax melting in the range of 40°–120° C., and 5–25 parts by weight of at least one polymer of the group consisting of a liquid polybutadiene having a number-average molecular weight of 500–10,000, a polybutene having a number-average molecular weight of 300–3,000 and a polyisobutylene having a viscosity-average molecular weight of 20,000–50,000, said composition being emulsified in water, wherein said liquid polybutadiene is selected from the group consisting of low homopolymers of butadiene, copolymers of butadiene and one or more od conjugated diolefins of 4–5 carbon atoms, and low copolymers of butadiene and aliphatic or aromatic vinyl monomers having an ethylene unsaturation.

2. The wax emulsion prepared from a composition comprising 100 parts by weight of a hydrocarbon wax melting in the range of 40°–120° C., and 5–25 parts by weight of at least one polymer of the group consisting of a liquid polybutadiene having a number-average molecular weight of 500–10,000, a polybutene having a number-average molecular weight of 300–3,000 and a polyisobutylene having a viscosity-average molecular weight of 20,000–50,000, said composition being emulsified in water, wherein prior to emulsification with water, the composition is blended with at least one member selected from the group consisting of petroleum resins, ethylene-vinyl acetate copolymers and asphalt, said member being in an amount of not more than 10 parts by weight per 100 parts of said hydrocarbon wax.

3. The wax emulsion prepared from a composition comprising 100 parts by weight of a hydrocarbon wax melting in the range of 40°–120° C., and 5–25 parts by weight of at least one polymer of the group consisting of a liquid polybutadiene having a number-average molecular weight of 500–10,000, a polybutene having a number-average molecular weight of 300–3,000 and a polyisobutylene having a viscosity-average molecular weight of 20,000–50,000, said composition being emulsified in water, wherein an emulsifier in the amount of 3–25 parts per 100 parts of said hydrocarbon wax is added prior to emulsification with water.

* * * * *